Jan. 7, 1958 — V. VOORHEES — 2,819,106

OIL SEAL

Filed March 22, 1952

INVENTOR:
VANDERVEER VOORHEES

United States Patent Office 2,819,106
Patented Jan. 7, 1958

2,819,106

OIL SEAL

Vanderveer Voorhees, Los Altos, Calif.

Application March 22, 1952, Serial No. 277,960

9 Claims. (Cl. 288—3)

This invention relates to sealing devices or mechanical packings used to prevent the escape of fluids such as oil around moving machine parts. More particularly it relates to an oil seal which is adapted to fit a moving shaft protruding from a housing having a cylindrical recess into which the seal is pressed.

Figure 1:
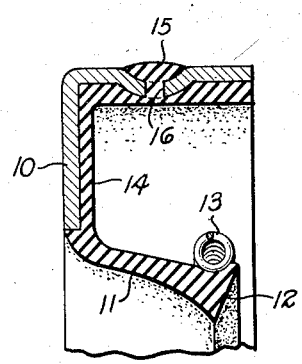
Figure 2:
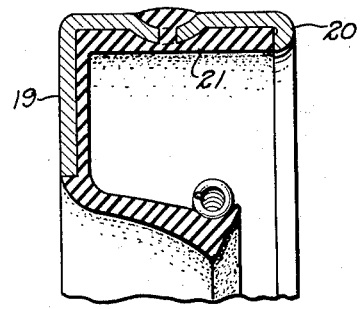
Figure 4:
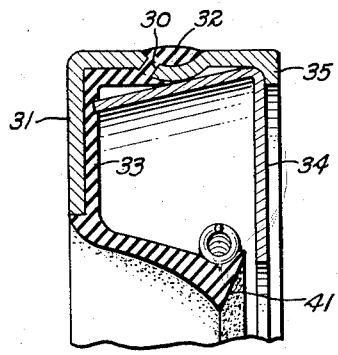
Figure 3:
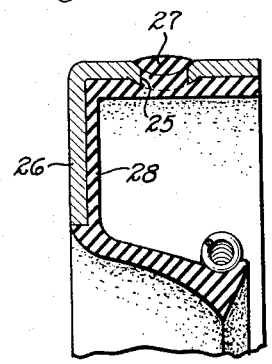
Figure 5:
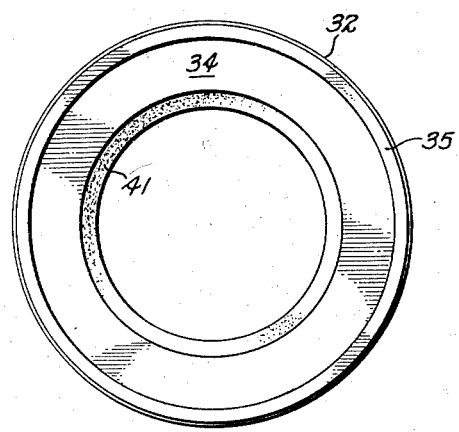
Figure 6:
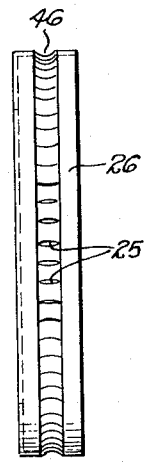

The invention is illustrated by a drawing in which Figures 1, 2 and 3 are cross sections of different modifications of the seal in which the case is a single metal stamping. Figure 4 is a cross sectional view of the seal employing an inner case. Figure 5 is an end view of the seal of Fig. 4 and Figure 6 is a side view of the case of the seal of Figure 3.

One object of the invention is to provide an oil seal having a rigid case and an elastic sealing member molded and bonded thereto with a ring of the said elastic material on the outer periphery of the case to insure a leak tight seal in the housing. Another object of the invention is to provide a seal with a rigid, cylindrical case and a sealing gasket bonded to the outer periphery thereof in such a way that it will not be scraped off and destroyed when the seal is pressed into a housing bore. Still another object of the invention is to provide a seal with a gasket on the periphery of the case, protected by a section of the rigid case on both sides, adapting the seal to be pressed into a housing bore in either direction without damage to the gasket. A further object of the invention is to provide an elastic gasket on the periphery of a seal with a resilient base extending through the rigid seal case.

Heretofore it has been common to make oil seals with a case of steel or other rigid material which is slightly larger than the housing bore, e. g. .005 to .025 inch larger, to provide a tight fit when pressed in. In order to prevent leakage caused by imperfections in the machining, etc. it has been customary to apply a sealing compound or cement when installing these seals. Attempts to solve the problem of fitting have led to the development of the rubber covered seal as shown in U. S. Patent No. 2,249,141. However, these seals have had the disadvantage of requiring a smooth, chamfered housing bore as otherwise the sharp edges of the bore would cut the rubber when installing the seal.

According to this invention, the outer case of the seal is provided with a circumferential depression or groove in which a band or bead of rubber or other elastic sealing material is fixed by bonding and vulcanizing. It is preferred that this band extend beyond the surface of the case, for example .010 to .100 inch to engage the surface of the housing bore and provide a tight seal.

In order to prevent damage to this gasket band when installing the seal, there are provided openings in the seal case beneath the band, into which the rubber may flow when subjected to great pressure as when compressed in the groove in the seal case. For this purpose, holes may be punched in the case before or after forming, or the case may be slotted as will be shown hereinafter.

Referring to the drawing, Figure 1 shows a section of a seal case wherein a rigid ring or flange 10 of general L shape has molded thereto a rubber sealing element 11 provided with lip 12 to engage a shaft not shown. A groove in the lip section supports garter spring 13. The rubber extends inside the case in the form of lining 14. A groove formed in the periphery of the case 10 is filled with rubber gasket 15. A plurality of openings 16 lead from the groove to the inside of the case joining the gasket 15 to the lining 14. When installing the seal by driving or pressing into a housing bore, the rubber in groove 15 flows through openings 16 to a degree sufficient to prevent shearing off at the edge of the groove.

The seal can be made by compression, transfer or injection molding. The case 10 is placed in the mold, locating it at the periphery, and the rubber forced into the lip groove and over the inner surface of the case. It flows through openings 16 to fill the groove 15 and form the gasket. When withdrawing the part from the mold, rubber in groove 15 may flow through holes 16 to a degree, facilitating withdrawing the part from the mold.

The seal shown in Figure 2 differs from that of Figure 1, in having the case 19 turned in at the edge to provide a smooth shoulder 20 to retain the rubber 21.

The seal of Figure 3 likewise resembles that of Figure 1 but the openings 25 in case 26 are in the form of slits giving greater area of access between the groove 27 and the liner 28. In addition, the metal or other rigid material of which the case is constructed, is made to yield slightly between the slits, enhancing the resiliency of the gasket 27. The slits 25 can be formed in the sheet of metal before forming the flange, for example, by employing a progressive die. Subsequently the groove can be rolled in and the slits opened in this operation.

For some applications it is desirable to protect the lip and garter spring with an inner case as shown in Figure 4. Here the openings 30 in case 31 are positioned at one side of the gasket groove 32 and the rubber liner 33 is terminated at the bottom of the groove. Inner case flange 34 is placed in position and the edge of the outer case is turned over it at 35 to close the seal.

Figure 5 is an end view of the seal in Figure 4, showing the inner case 34, the lip 41, the rolled edge of the outer case 35 and the raised gasket 32 at the periphery.

Figure 6 is a side view of the case of the seal in Figure 3 before molding. Slits 25 are shown in the groove 46, spaced at frequent intervals, for example ⅛ to ½ inch apart.

The elastic sealing material used in my seals may be any of the moldable flexible materials commonly used in the art. Thus I may use neoprene rubber, Buna N rubber, polyacrylic rubber or other elastomer, preferably oil resistant. Natural rubber, gutta percha, Thiokol, silicone rubber, polyfluorethylene and other moldable flexible materials can be used for special purposes. These materials can be compounded with graphite, carbon black, zinc oxide, molybdenum sulfide, sulfur and other materials commonly used in the art.

The seal cases are most conveniently formed of sheet metal stampings, usually steel. Brass, aluminum, stainless steel etc. can also be used. Rigid cases can also be formed of plastics, for example laminated plastics such as phenol-formaldehyde resins with cotton or glass fibre.

To obtain strong bonds between the metal case and the rubber gasket, it is desirable to clean the metal thoroughly to remove all grease. Sand blasting can be used. A bonding resin such as "Pliobond," "Durez" resin or chlorinated rubber is applied to the surface before molding.

After molding, it is only necessary, in the case of the one piece designs, to trim the lip of the seal and it is ready for use. The lip may be trimmed by a knife, a grinding wheel or other suitable means. It is sometimes possible to mold the lip with sufficient accuracy to obviate the trimming operation.

Having thus described my invention, what I claim is:

1. A packing seal adapted to surround a shaft protruding from a housing and press fit a cylindrical bore concentric with said shaft, said seal comprising a flexible, shaft engaging element permitting movement of said shaft while preventing flow of liquid along the surface thereof, a rigid cylindrical case, a circumferential groove in the outer periphery of said case, a plurality of openings in the case communicating between said groove and the interior of said case and an elastic gasket material extending above the outer surface of said case filling said groove and extending through said openings into the interior of said case.

2. In an oil seal having a rigid cylindrical metal case and interiorly thereof, a flexible sealing element adapted to engage a shaft, the improvement comprising a circumferential groove in the outer periphery of said case, a flexible gasket within said groove extending above the outer surface of said case and firmly bonded thereto, openings in the case between said groove and the interior of said case and a flexible material within said openings resiliently supporting said gasket, permitting the volumetric dimension of said gasket to diminish when subjected to pressure by flowing through said openings.

3. The seal of claim 2 wherein said openings are in the form of slits.

4. The seal of claim 2 wherein said openings are in the form of slits transverse to said groove and uniformly spaced about the periphery of said seal.

5. In an oil seal having a substantially cylindrical metal case adapted to press fit into a housing bore, a circumferential groove in the outer periphery of said case approximately midway between the sides thereof, an elastic gasket within said groove extending above the outer surface of said case and bonded thereto and holes in the bottom of said groove to relieve the pressure on said elastic gasket when installing in a housing bore.

6. The seal of claim 5 wherein said elastic gasket is molded to said seal case integrally with the sealing element therewithin.

7. In a packing seal having a cylindrical metal case and a flexible sealing element therewithin and bonded thereto adapted to surround a moving shaft protruding from a concentric cylindrical housing bore, the improvement comprising a circumferential, elastic gasket on the outer peripheral surface of said seal case confined between bare metal areas on the periphery of said case having a diameter sufficient to press fit in said bore, said gasket having a greater diameter than said metal areas, and perforations through said case beneath said gasket to relieve excessive pressure imposed on said gasket by said housing bore during installation of said seal.

8. The seal of claim 7 wherein the said metal case is flanged with L-shaped cross section.

9. A rubber packing seal for moving shafts having a cylindrical metal case of L-shaped cross-section, a flexible rubber sealing element bonded to the interior of said case adapted to contact a moving shaft therewithin, and a groove in the periphery of said case connected by apertures with the interior thereof, said rubber extending continuously from said flexible sealing element across the inner surface of said case through said apertures into said groove, and slightly beyond the periphery of said metal case.

References Cited in the file of this patent

UNITED STATES PATENTS

| | | |
|---|---|---|
| 1,992,790 | Victor et al. | Feb. 26, 1935 |
| 2,249,141 | Johnson | July 15, 1941 |
| 2,405,279 | Victor | Aug. 6, 1946 |
| 2,455,202 | Ware | Nov. 30, 1948 |
| 2,509,461 | Ulseth | May 30, 1950 |

FOREIGN PATENTS

| | | |
|---|---|---|
| 479,743 | Great Britain | May 30, 1950 |
| 544,904 | Great Britain | May 1, 1942 |
| 569,821 | Great Britain | June 11, 1945 |